(12) United States Patent
Lee

(10) Patent No.: US 10,085,013 B2
(45) Date of Patent: Sep. 25, 2018

(54) 3D CAMERA MODULE

(71) Applicant: LG ELECTRONICS INC., Seoul (KR)

(72) Inventor: Changhwan Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 15/107,853

(22) PCT Filed: Dec. 24, 2013

(86) PCT No.: PCT/KR2013/012079
§ 371 (c)(1),
(2) Date: Jun. 23, 2016

(87) PCT Pub. No.: WO2015/099211
PCT Pub. Date: Jul. 2, 2015

(65) Prior Publication Data
US 2016/0337633 A1    Nov. 17, 2016

(51) Int. Cl.
*H04N 13/254*    (2018.01)
*H04N 13/257*    (2018.01)
(Continued)

(52) U.S. Cl.
CPC ....... *H04N 13/254* (2018.05); *G01B 11/2513* (2013.01); *G02B 5/18* (2013.01);
(Continued)

(58) Field of Classification Search
CPC ........... H04N 13/0253; H04N 13/0257; H04N 5/2226; H04N 5/2256; G01B 11/2513; G02B 5/18; G02B 26/0833
(Continued)

(56) References Cited

U.S. PATENT DOCUMENTS

2002/0185535 A1* 12/2002 Tsikos .................... B82Y 15/00
                                                              235/454
2004/0147910 A1*  7/2004 Fujieda .................. A61B 18/20
                                                                606/5
(Continued)

FOREIGN PATENT DOCUMENTS

| KR | 10-2005-0026949 A | 3/2005 |
| KR | 10-2010-0043970 A | 4/2010 |
| KR | 10-2012-0109722 A | 10/2012 |
| KR | 10-1341620 B1 | 12/2013 |

*Primary Examiner* — Paulos M Natnael
*Assistant Examiner* — Sean N Haiem
(74) *Attorney, Agent, or Firm* — Birch, Stewart, Kolasch & Birch, LLP

(57) ABSTRACT

A 3D depth camera module, including a light transmitting portion having a laser for emitting light, and having a diffractive optical element for passing the light therethrough such that the light reaches a subject with a preset pattern; a light receiving portion configured to receive the light reflected from the subject; an analyzing portion configured to analyze a 3D shape of the subject, based on a shifted degree of the reflected light; and an operating portion configured to move part of the light transmitting portion such that a position of one region of the subject where the light reaches is changed. Further, the operating portion moves at least part of the light transmitting portion by a predetermined length being set to restrict repetitive arrival of the light onto one region of the subject; the diffractive optical element includes a plurality of spots spaced from each other by a predetermined spaced interval between two adjacent spots of the diffractive optical element; and the predetermined length is smaller than the predetermined interval.

7 Claims, 8 Drawing Sheets

(51) Int. Cl.
  *G01B 11/25*  (2006.01)
  *H04N 5/225*  (2006.01)
  *H04N 5/18*   (2006.01)
  *G02B 5/18*   (2006.01)
  *G02B 26/08*  (2006.01)
  *H04N 13/00*  (2018.01)
  *H04N 5/222*  (2006.01)
  *H04N 13/02*  (2006.01)

(52) U.S. Cl.
  CPC ....... *G02B 26/0833* (2013.01); *H04N 5/2226* (2013.01); *H04N 5/2256* (2013.01); *H04N 13/0253* (2013.01); *H04N 13/0257* (2013.01); *H04N 13/257* (2018.05); *H04N 5/2257* (2013.01)

(58) Field of Classification Search
  USPC ............ 348/46, 135, 80; 356/479, 498, 511; 606/5
  See application file for complete search history.

(56) References Cited

U.S. PATENT DOCUMENTS

| | | | |
|---|---|---|---|
| 2005/0274913 A1* | 12/2005 | Sawada | G01B 11/2518 250/559.05 |
| 2010/0118123 A1* | 5/2010 | Freedman | G01B 11/25 348/46 |
| 2011/0279823 A1* | 11/2011 | Ueki | G01B 11/2441 356/511 |
| 2012/0242829 A1* | 9/2012 | Shin | G01B 11/026 348/135 |
| 2012/0257211 A1* | 10/2012 | Kubota | A61B 3/102 356/479 |
| 2013/0088723 A1* | 4/2013 | Feldkhun | G01B 9/02082 356/498 |
| 2014/0028799 A1* | 1/2014 | Kuffner | G01B 11/24 348/46 |
| 2015/0054937 A1* | 2/2015 | Lippert | G02B 21/0028 348/80 |

* cited by examiner

3D CAMERA MODULE

TECHNICAL FIELD

The present invention relates to a 3D camera module capable of processing a shape in the form of an image by recognizing a depth of an object.

BACKGROUND ART

The conventional camera obtains depth information, three-dimensional (3D) information, based on an image obtained by using a two-dimensional (2D) image sensor. Recently, a structured light method and a time of flight (TOF) method are used. The structured light method is used to measure a depth of an object by irradiating laser light on which a specific pattern has been coded onto the object, and by calculating a pattern shift amount of the reflected light. And the TOF method is used to measure a depth of an object by directly irradiating light onto the object, and by calculating time taken for the reflected light to return.

However, the structured light method has a restriction in miniaturizing the 3D camera module due to a physical size of a light transmitting portion and a light receiving portion configured to receive reflected light and using a laser optical source. This may cause a difficulty in applying the structured light method to mobile products. Further, the structured light method adopts a fixed focal lens and a passive coding device. This may cause the structured light method not to have a flexible scheme to enhance a depth resolution.

Next, the TOF method has a limitation in usage, due to a high cost of a ToF exclusive sensor which calculates a time proportional to a distance of return light, and high power consumption of an LED having its brightness modulated. Recently, a 3D camera is being presented to enhance a performance through an image synthesis with the conventional 2D camera. For instance, an RGBIR camera for measuring a 2D image and a 3D depth by a single camera is being developed. The RGBIR camera is implemented by combining a 2D camera and a 3D IR camera for depth measuring, and uses an RGBIR sensor and a single lens.

However, in the RGBIR camera, RGB light is incident onto IR pixels as crosstalk, and IR light is incident onto RGB pixels as crosstalk. This may cause optical noise, and thus lower performance.

SUMMARY OF THE INVENTION

Therefore, an object of the present invention is to provide a 3D camera having an enhanced resolution.

To achieve these and other advantages and in accordance with the purpose of the present invention, as embodied and broadly described herein, there is provided a 3D camera module, including: a light transmitting portion having a laser for emitting light, and having a diffractive optical element for passing the light therethrough such that the light reaches a subject with a preset pattern; a light receiving portion configured to receive the light reflected from the subject; an analyzing portion configured to analyze a 3D shape of the subject, based on a shifted degree of the reflected light; and an operating portion configured to move part of the light transmitting portion such that a position of one region of the subject where the light reaches is changed.

In an embodiment of the present invention, the operating portion may be formed to transfer an entire part of the light transmitting portion.

In an embodiment of the present invention, the light transmitting portion may further include: a lens portion configured to change the light into parallel light; and a mirror portion configured to reflect the parallel light which has passed through the lens portion, to the diffractive optical element. And the operating portion may be connected to the mirror portion to change a reflection direction of the light.

In an embodiment of the present invention, the mirror portion may include a plurality of digital micro-mirror devices (DMDs), and the operating portion may move at least one of the DMDs.

In an embodiment of the present invention, the operating portion may be formed to move the diffractive optical element.

In an embodiment of the present invention, the operating portion may move at least part of the light transmitting portion by a predetermined length, and the predetermined length may be set to restrict repetitive arrival of the light onto one region of the subject.

In an embodiment of the present invention, the diffractive optical element may include a plurality of spots spaced from each other by a predetermined interval, and the predetermined length may be formed to be smaller than the predetermined interval.

In an embodiment of the present invention, the 3D depth camera module may further include a camera sensor configured to record the light reflected from the subject, based on a preset input signal. And an operation signal to activate the operating portion in order to move at least part of the light transmitting portion may be output in a synchronized manner with the input signal.

In an embodiment of the present invention, the camera sensor may include an image processing portion configured to form a color image using the light.

Firstly, the operating portion of the present invention may be configured to move at least one component of the light transmitting portion such that light may reach different regions of the subject as much as possible.

With such a configuration, a resolution may be enhanced without increase of the number of spots where light passes. This may allow a shape of the subject to be predicted more accurately, and may allow the shape to be output in the form of an image of enhanced quality.

The camera module may recognize a depth of a small object more precisely, and may provide a partial shape of the single subject in more detail.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings.

Figure 1:
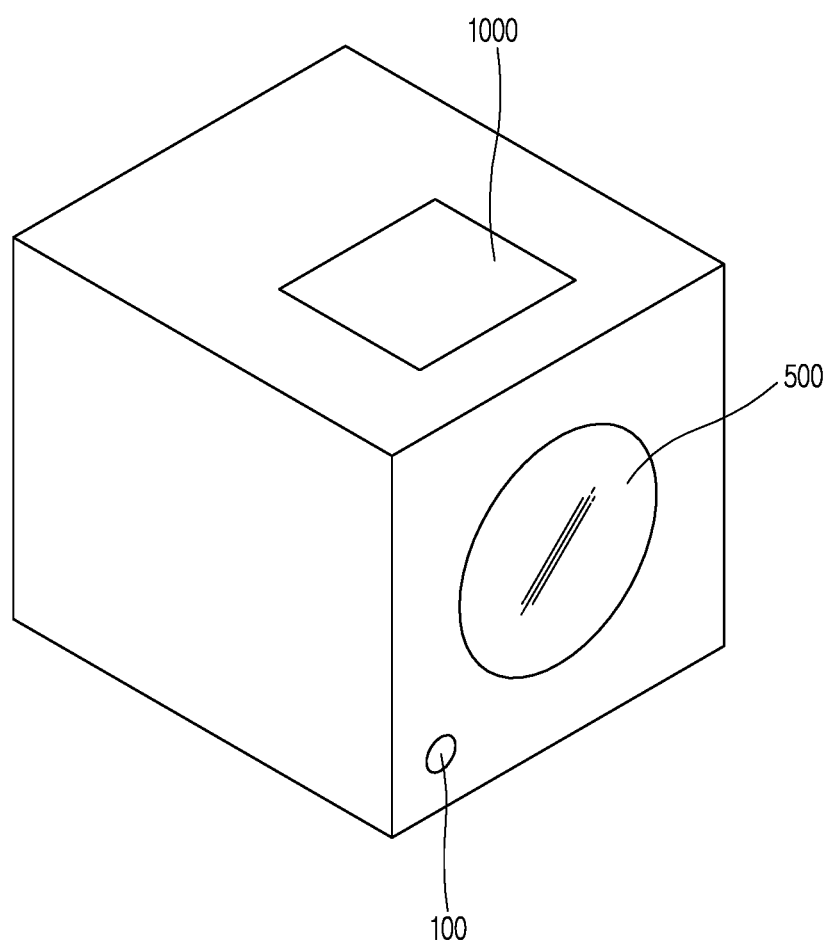
FIG. 1 is a perspective view illustrating appearance of a depth camera according to an embodiment of the present invention.
Figure 2A:
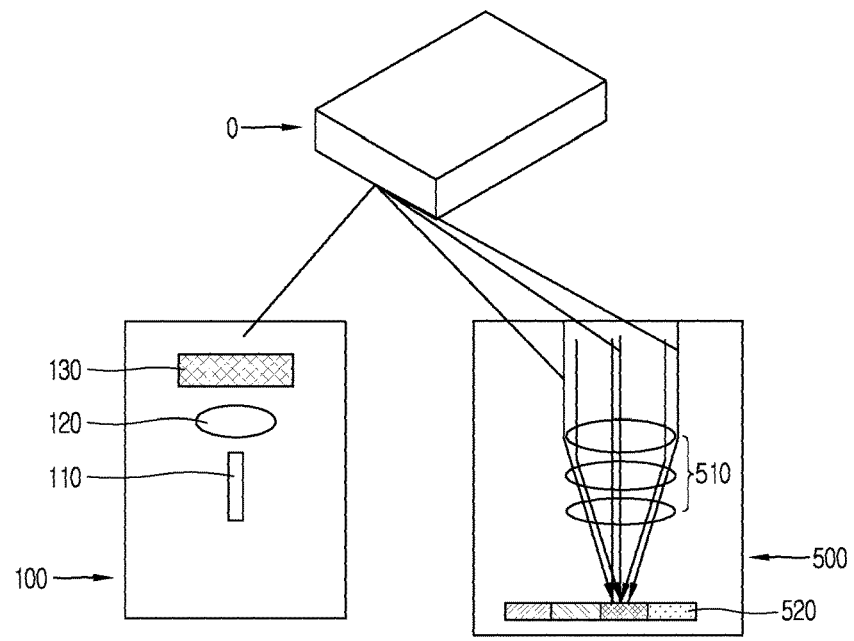
FIG. 2A is a conceptual view for explaining a light transmitting portion and a light receiving portion of a depth camera according to the present invention.
Figure 2B:
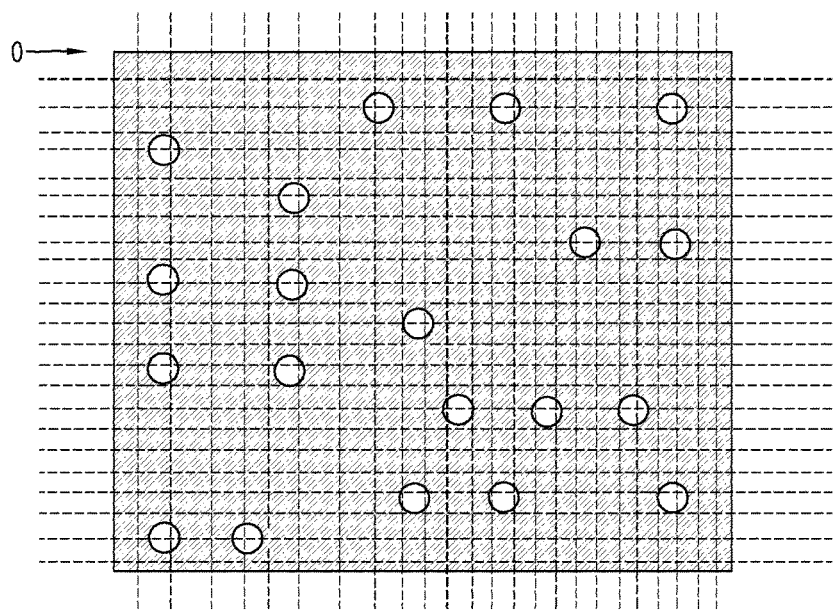
FIG. 2B is a conceptual view for explaining a diffractive optical element included in a light transmitting portion.

FIG. 1 is a perspective view illustrating appearance of a depth camera according to an embodiment of the present invention. FIG. 2A is a conceptual view for explaining a light transmitting portion and a light receiving portion of the depth camera according to the present invention. And FIG. 2B is a conceptual view for explaining a diffractive optical element included in the light transmitting portion.

The depth camera 1000 according to the present invention includes a light transmitting portion 100 configured to emit light to a subject 0, a light receiving portion 500 configured to receive the light reflected from the subject 0, and an analyzing portion (not shown) configured to analyze a 3D shape of the subject using the light collected by the light receiving portion 500. The depth camera 1000 of the present invention irradiates light from the light transmitting portion 500 to the subject 0, and calculates a shift amount of the light reflected from the subject 0, thereby analyzing a depth of a partial region of the subject 0. That is, the light transmitting portion 100 and the light receiving portion 500 are spaced from each other by a predetermined distance.

The light transmitting portion 100 includes a laser 110 configured to emit light as an optical source, and a lens portion 120 configured to convert the light generated from the laser 110 into parallel light. The lens portion 120 may be configured as a collimator lens.

The light transmitting portion 100 includes a diffractive optical element 130 configured to transform the parallel light by the lens portion 120, into light having a preset resolution.

FIG. 2B is a conceptual view illustrating a diffractive optical element 130 in an enlarged manner. Circular regions mean regions (spots) where diffracted light passes through. The diffractive optical element 130 is formed to have a predetermined number of spots. For instance, the diffractive optical element 130 may include about 50,000 spots. This may correspond to about 4% of an entire area of the diffractive optical element 130.

Light which has passed through the diffractive optical element 130 reaches the subject 0, with a preset resolution. That is, a depth of the subject 0 is determined based on the number of spots included in the diffractive optical element 130. Accuracy in recognizing a depth of the subject 0 is reduced when a size of a spot formed in the diffractive optical element 130 of the same size is small, and when a distance to the subject 0 is long.

The light receiving portion 500 includes at least one lens 510, and an image processing portion 520 including an RGB filter. A color image using the light which has reached the subject 0 may be generated by the image processing portion 520.

In the present invention, a region of the subject where light reaches is increased as at least one component of the light transmitting portion 100 is moved. That is, the light transmitting portion 100 is formed such that light which has passed through the diffractive optical element 130 reaches different regions.

Figure 3A:
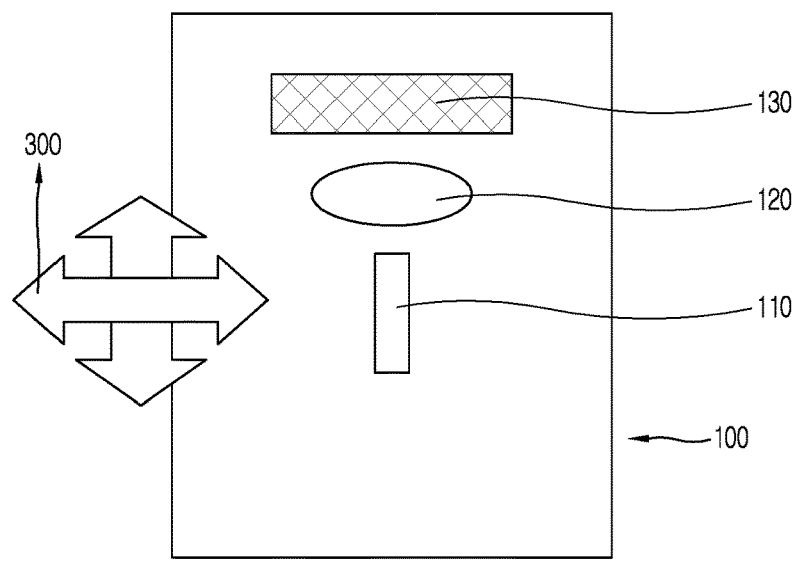
FIGS. 3A and 3B are conceptual views of a light transmitting portion formed such that at least one component thereof is moveable.
Figure 3B:
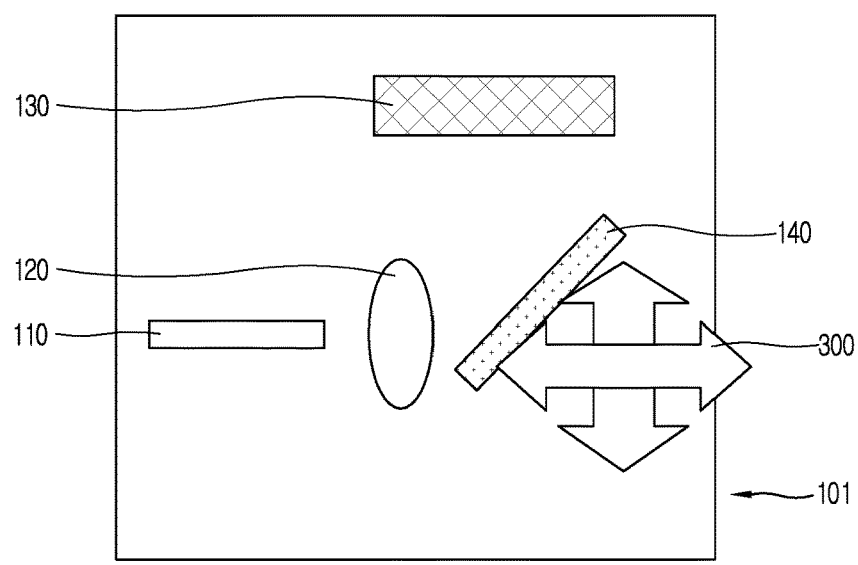

FIGS. 3A and 3B are conceptual views of a light transmitting portion formed such that at least one component thereof is moveable. Referring to FIG. 3A, the light transmitting portion 100 includes an operating portion 300 configured to move at least one component of the light emitting portion 100.

A direction to move at least one component of the light emitting portion 100 by the operating portion 300 is perpendicular to a direction to emit light from the laser 110. For instance, if the laser 110 irradiates light to a front side toward the subject 0, the operating portion 300 may move the at least one component in at least one direction among upper and lower directions, right and left directions, and a diagonal direction.

The operating portion 300 may be formed to move the light transmitting portion 100 wholly. For instance, the light transmitting portion 100 may be formed as a single light emitting module, the operating portion 300 may be formed at the light emitting module, and the light emitting module may be moved on the basis of the light receiving portion 500.

The operating portion 300 is synchronized with the image processing portion 520 in order to move the at least one component. That is, an operation to move a component by the operating portion 300, and a signal to input light by the light receiving portion 500 are synchronized with each other.

Once the light transmitting portion 100 moves by the operating portion 300, a region on the subject 0 where light emitted from the light transmitting portion 100 reaches is also changed. Accordingly, the light may be reflected from a larger number of regions, and may be made to be incident onto the light receiving portion 500. That is, a resolution of the light to determine a depth of the subject 0 is increased.

Although not shown, the operating portion 300 may move the light transmitting portion 100 at preset time intervals. Alternatively, the operating portion 300 may be controlled to move the light transmitting portion 100 at preset time intervals.

For instance, the preset time interval is preferably formed to be smaller than a distance between the spots. This may prevent light from repeatedly reaching one region of the subject where the light has reached, and thereby may enhance a resolution.

The operating portion 300 may move at least one of the diffractive optical element 130 and the laser 110, according to a preset basis. Once the diffractive optical element 130 moves, light is distributed to have another pattern. This may cause a region of the subject 0 where light reaches, to be changed. Further, if the laser 110 (optical source) moves, light reaches another region of the diffractive optical element 130. This may provide the same effect as an operation to move the diffractive optical element 130.

A light transmitting portion 101 shown in FIG. 3B may include a mirror portion 140 configured to change a moving path of light. The mirror portion 140 is disposed on a moving path of light, and reflects the light such that the light reaches the diffractive optical element 130. The mirror portion 140 may include a plurality of digital micro-mirror devices (DMD).

The operating portion 300 may be mounted to the mirror portion 140 to move the mirror portion 140. For instance, the operating portion 300 may convert a reflection direction of the light by controlling an angle of the mirror portion 140.

Although not shown, if the camera module includes a prism, the operating portion 300 may rotate or move the prism.

The operating portion 300 may be mounted to at least one of the plurality of DMDs.

The operating portion 300 may be mounted to a plurality of components to change a moving path of the light. Accordingly, the number of distinguishable regions of the subject where the light reaches is increased, and a resolution of the light to detect a depth of the subject is increased.

Hereinafter, a moving path of the diffractive optical element 130 will be explained with reference to the attached drawings.

FIGS. 4A to 4E are conceptual view for explaining a resolution increase due to a movement of a diffractive optical element.

Figure 4A:
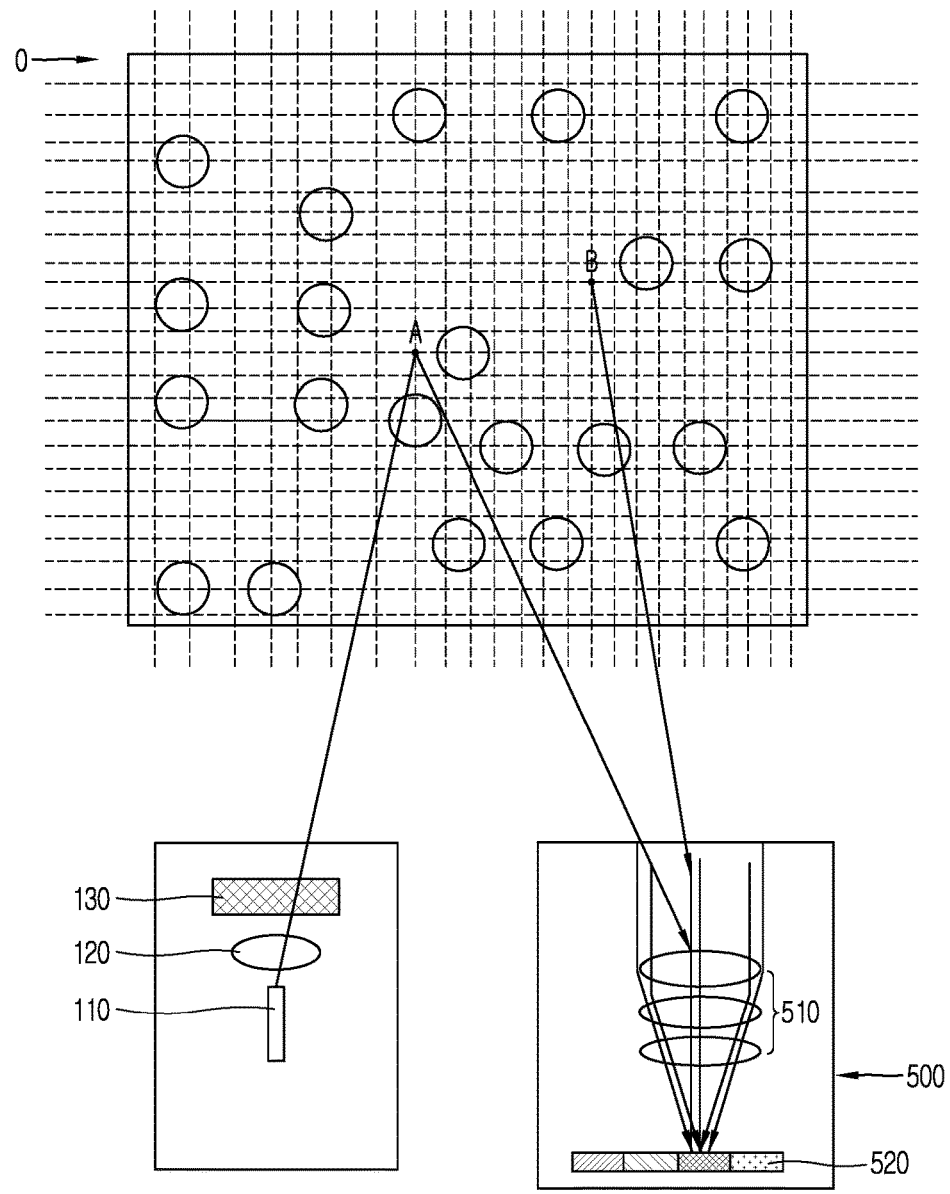
FIGS. 4A to 4E are conceptual view for explaining a resolution increase due to a movement of a diffractive optical element.

Although not shown, the light transmitting portion, the light receiving portion, and FIG. 4A correspond to a case where the diffractive optical element is not moved. Bright regions mean regions where parallel light emitted from the laser pass through in a distributed manner to reach the subject. That is, the distributed light reaches the separated regions of the subject 0.

For instance, light does not reach regions 'A' and 'B' of the subject 0. This may cause light reflected from the regions 'A' and 'B' not to be received, and the regions 'A' and 'B' not to be recognizable.

Figure 4B:
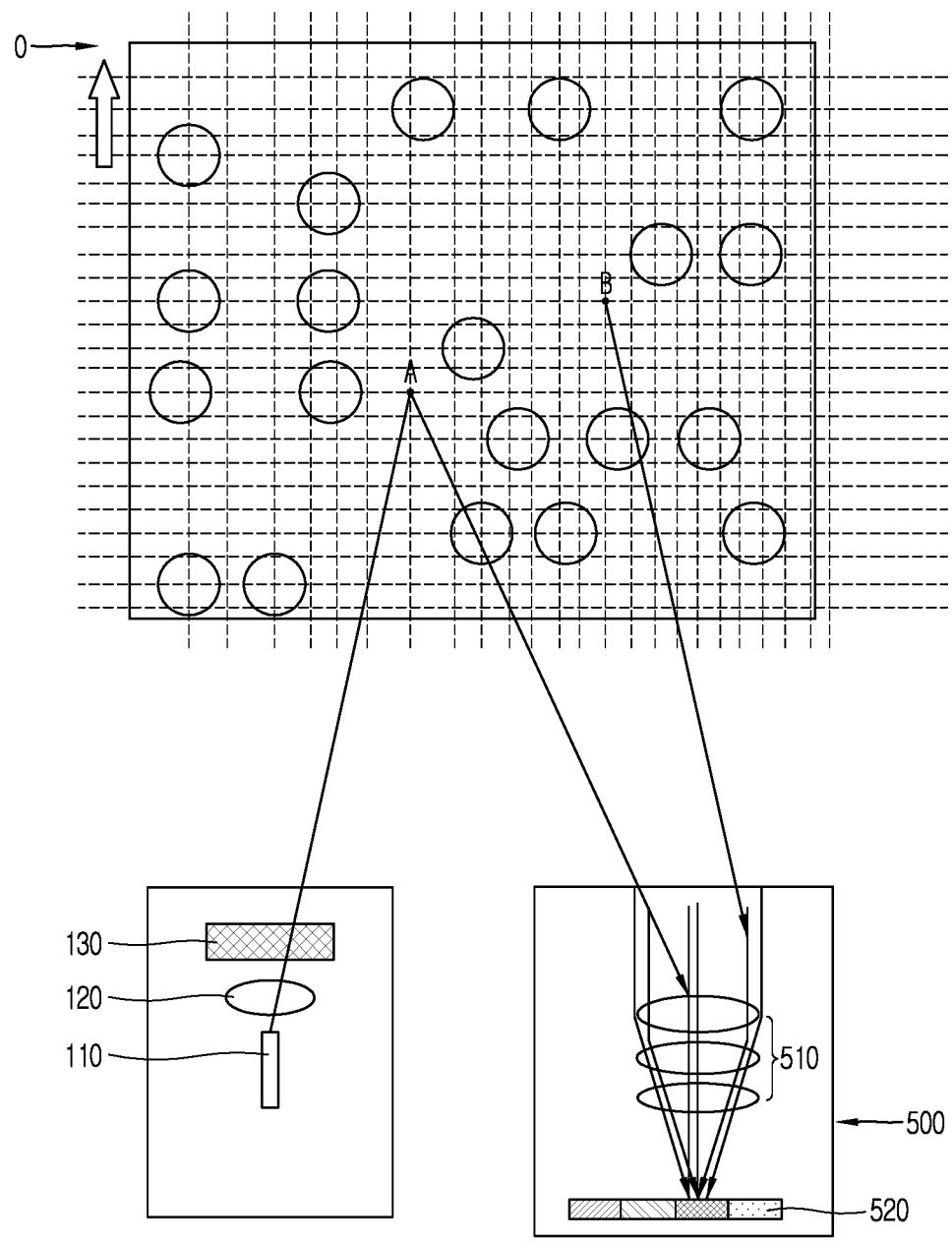

FIG. 4B illustrates a case where the diffractive optical element 130 has moved upward based on the laser 110. As the diffractive optical element 130 moves, parallel light emitted from the laser 110 may reach another region of the subject 0.

For instance, light may reach the region 'A' of the subject 0, and may not reach the region 'B' of the subject 0. As a result, the light receiving portion may receive the light reflected from the region 'A', and may detect a depth and a shape of the region 'A' by analyzing a shift of the light.

As a region on the subject 0 where light reaches is changed, the analyzing portion (not shown) may compare a shape of the subject 0 derived from the case of FIG. 4A, with a shape of the subject 0 derived from the case of FIG. 4B. Then, the analyzing portion may calculate a depth of each region on the subject, and may analyze a shape of the subject 0.

Figure 4C:
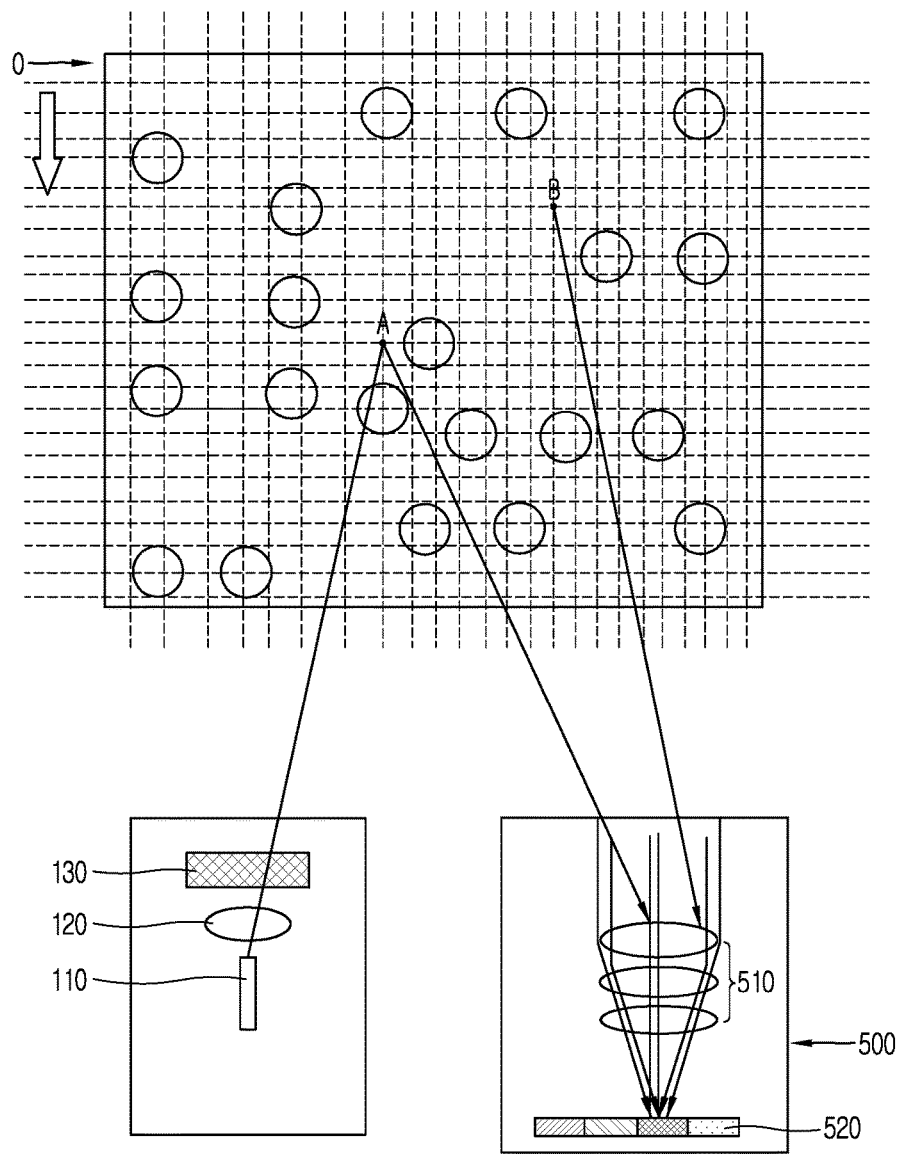

FIG. 4C illustrates a case where the diffractive optical element 130 has moved downward from the state shown in FIG. 4A. FIG. 4C illustrates that light does not reach the regions 'A' and 'B'. In this case, it is impossible to analyze a shape of the subject 0 at the regions 'A' and 'B'. However, the analyzing portion (not shown) predicts a shape of the subject 0 at the regions 'A' and 'B', based on light which has reached another region of the subject 0.

Figure 4D:
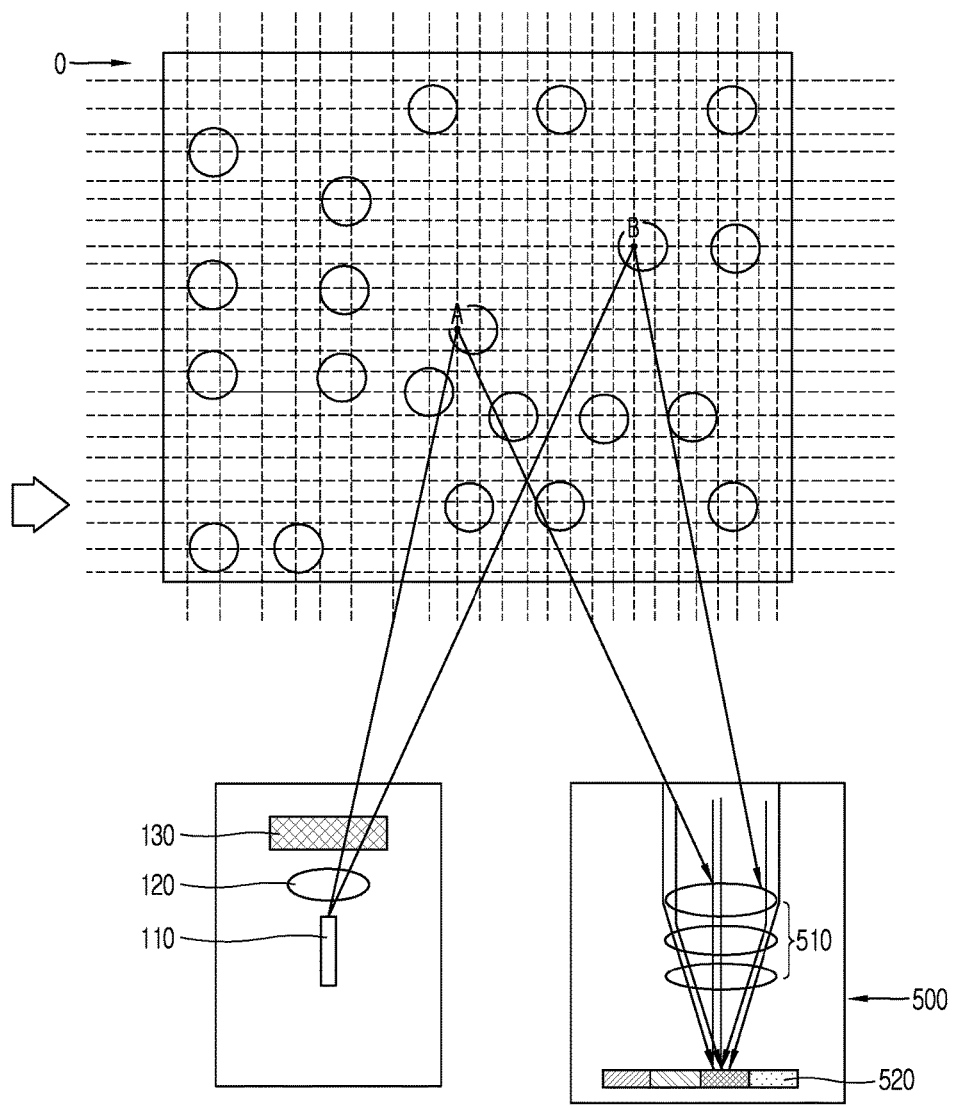

FIG. 4D illustrates a case where the diffractive optical element 130 has moved rightward from the state shown in FIG. 4A. In this case, light may reach the regions 'A' and 'B', and the light receiving portion 500 may receive the light reflected from the regions 'A' and 'B'. And the analyzing portion may calculate a depth of the subject 0 at the regions 'A' and 'B', and may predict a shape of the subject 0 at the regions 'A' and 'B'.

Figure 4E:
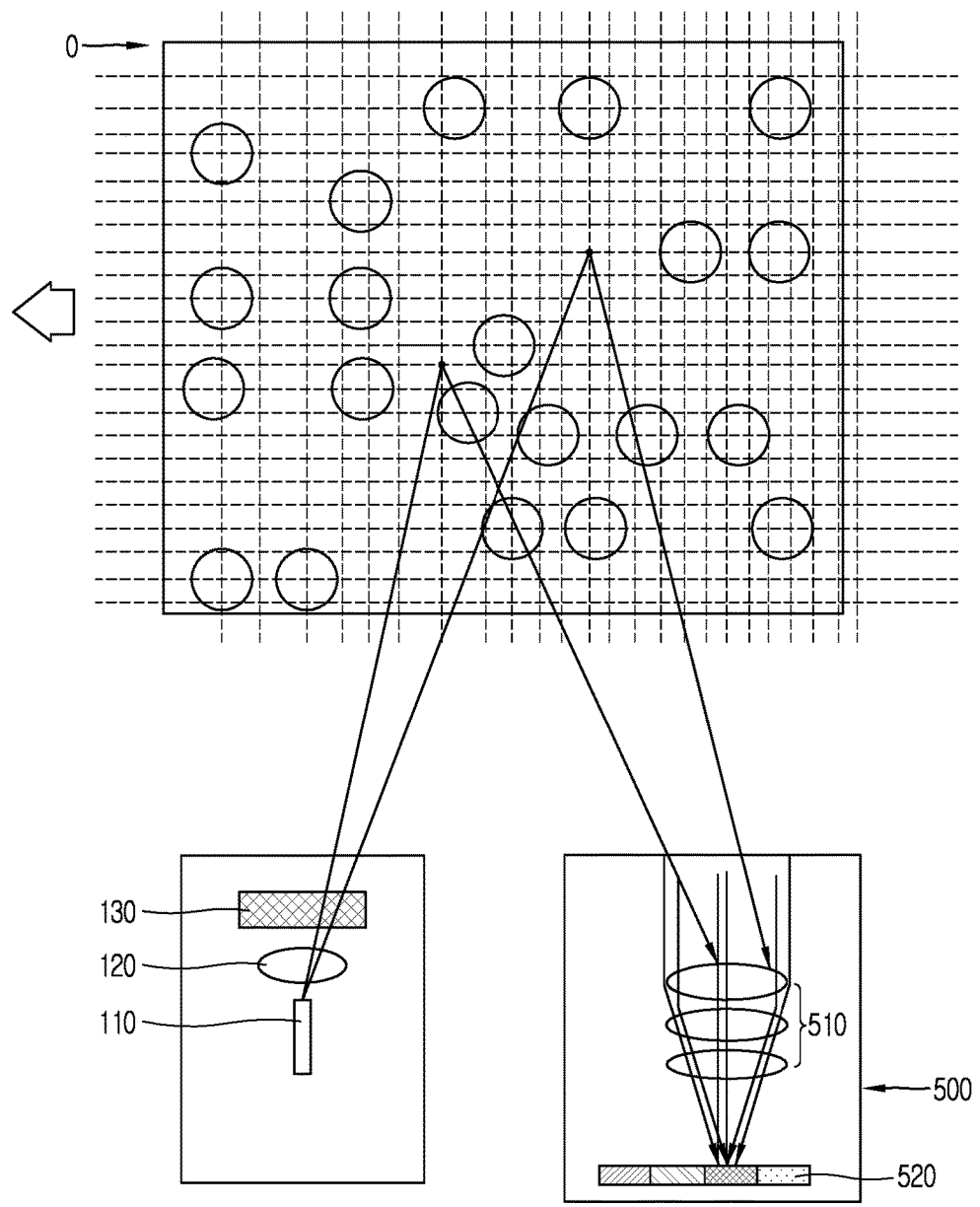

FIG. 4E illustrates a case where the diffractive optical element 130 has moved leftward from the state shown in FIG. 4A. In this case, like in FIG. 4C, light does not reach the regions 'A' and 'B'.

The operating portion may move at least one component of the light transmitting portion such that light may reach different regions on the subject as much as possible.

With such a configuration, a resolution may be enhanced without increase of the number of spots where light passes. This may allow a shape of an object to be predicted more accurately, and may allow the shape to be output in the form of an image of enhanced quality.

The camera module 1000 may recognize a depth of a small subject more precisely, and may provide a partial shape of the single subject in more detail.

The 3D depth camera module is not limited to the configuration and the method of the aforementioned embodiments. Rather, the embodiments may be selectively combined to each other partially or wholly, for various modifications.

The present invention may be applicable to various industry fields using a 3D camera which recognizes a shape of an object and provides a 3D image.

The invention claimed is:

1. A 3D depth camera module, comprising:
   a light transmitting portion having a laser for emitting light, and having a diffractive optical element for passing the light therethrough such that the light reaches a subject with a preset pattern;
   a light receiving portion configured to receive the light reflected from the subject;
   an analyzing portion configured to analyze a 3D shape of the subject, based on a shifted degree of the reflected light; and
   an operating portion configured to move part of the light transmitting portion such that a position of one region of the subject where the light reaches is changed,
   wherein the operating portion moves at least part of the light transmitting portion by a predetermined length being set to restrict repetitive arrival of the light onto one region of the subject,
   wherein the diffractive optical element includes a plurality of spots spaced from each other by a predetermined spaced interval between two adjacent spots of the diffractive optical element, and
   wherein the predetermined length is smaller than the predetermined interval.

2. The 3D depth camera module of claim 1, wherein the operating portion transfers an entire part of the light transmitting portion.

3. The 3D depth camera module of claim 1, wherein the light transmitting portion further includes:
   a lens portion configured to change the light into parallel light; and
   a mirror portion configured to reflect the parallel light which has passed through the lens portion, to the diffractive optical element, and
   wherein the operating portion is connected to the mirror portion to change a reflection direction of the light.

4. The 3D depth camera module of claim 3, wherein the mirror portion includes a plurality of digital micro-mirror devices (DMDs), and
   wherein the operating portion moves at least one of the DMDs.

5. The 3D depth camera module of claim 1, wherein the operating portion is formed to move the diffractive optical element.

6. The 3D depth camera module of claim 1, further comprising a camera sensor configured to record the light reflected from the subject, based on a preset input signal,
   wherein an operation signal to activate the operating portion in order to move the at least part of the light transmitting portion is output in a synchronized manner with the input signal.

7. The 3D depth camera module of claim 1, wherein the camera sensor includes an image processing portion configured to form a color image using the light.

\* \* \* \* \*